United States Patent [19]

Kazihara et al.

[11] 4,090,932
[45] May 23, 1978

[54] METHOD FOR CONCENTRATING AQUEOUS CAUSTIC ALKALI SOLUTION

[75] Inventors: Akira Kazihara, Chofu; Shinsaku Ogawa; Takekuni Kobayashi, both of Nobeoka; Maomi Seko, Tokyo, all of Japan

[73] Assignee: Asahi Kasei Kogyo Kabushiki Kaisha, Osaka, Japan

[21] Appl. No.: 733,714

[22] Filed: Oct. 18, 1976

[30] Foreign Application Priority Data

Oct. 28, 1975   Japan .............................. 50-128857

[51] Int. Cl.$^2$ ............................................. C25B 1/34
[52] U.S. Cl. ...................................... 204/98; 204/128
[58] Field of Search ................................ 204/98, 128

[56] References Cited

U.S. PATENT DOCUMENTS

| | | | |
|---|---|---|---|
| 3,403,083 | 9/1968 | Currey et al. | 204/98 |
| 3,909,378 | 9/1975 | Walmsley | 204/98 |
| 3,954,579 | 5/1976 | Cook et al. | 204/98 |

*Primary Examiner*—R. L. Andrews
*Attorney, Agent, or Firm*—Cooper, Dunham, Clark, Griffin & Moran

[57] ABSTRACT

Heated substances, e.g. electrolytes or gases from electrodes, formed during electrolysis of an alkali halide in an electrolytic cell using a cation exchange membrane to separate anode and cathode chambers are used effectively as heat source for heating an aqueous caustic alkali solution to be concentrated in an evaporator.

8 Claims, 9 Drawing Figures

METHOD FOR CONCENTRATING AQUEOUS CAUSTIC ALKALI SOLUTION

This invention relates to a method for concentrating an aqueous caustic alkali solution which is produced by electrolysis using a cation exchange membrane. More particularly, this invention pertains to a process for producing caustic alkali by electrolysis using a cation exchange membrane and further concentrating the caustic alkali produced, wherein the improvement comprises utilizing as heat source at the heating side of the evaporator the substances heated by the heat generated in the electrolytic cell thereby to effect heat exchange with the solution to be concentrated in the evaporator.

In the art of production of aqueous caustic alkali solutions, there have been known such processes as the mercury process, the asbestos diaphragm process and the ion exchange membrane process. A highly concentrated aqueous caustic alkali solution of 50% or more can directly be produced in mercury process by controlling the amount of water added at the time of amalgam decomposition and no particular concentration step is required at the time of production of aqueous caustic alkali solution.

On the other hand, in diaphragm process, it is generally difficult to obtain a high concentration-high purity caustic alkali. Therefore, in industrial application, the product is required to be concentrated to a considerable extent and to be purified by separation of sodium chloride.

For example, when caustic soda is produced by asbestos diaphragm process, only an aqueous caustic soda solution with a low concentration (about 11%) containing sodium chloride in a high concentration (about 17%) can be obtained. Such a product is required to be further concentrated under heating and purified. As is well known, such means as multiple-effect evaporator using boiler steam as heat source have conventionally been adopted for this purpose.

The electrolysis process using cation exchange membrane is advantageous in that the sodium chloride content in the product is very low (not more than 0.1%), although it is difficult to obtain a highly concentrated aqueous caustic soda solution directly as catholyte with a concentration of about 50%.

The object of the present invention is to provide a process for concentrating the aqueous caustic soda solution by heat exchange between the substances heated by the heat generated in the electrolytic cell by passage of current, and the solution to be concentrated in the evaporator. Since sodium chloride concentration is the high in the asbestos diaphragm process as mentioned above, sodium chloride may be precipitated on heat transmitting surfaces when such heat exchange is carried out. With the catholyte in cation exchange membrane electrolytic process, which contains extremely small amount of sodium chloride, such heat exchange can successfully be achieved. In other words, when the catholyte is concentrated with cooling, there is no danger of precipitation, so that heat exchange can effectively be carried out. Whereas, in asbestos diaphragm process, it is impossible to concentrate the alkali concentration in the catholyte to about 50% by the heat alone generated in the electrolytic cell, since said alkali concentration is too low.

Thus, the present invention provides a process for producing an aqueous caustic alkali solution by electrolysis of an alkali halide in an electrolytic cell using a cation exchange membrane to divide the cell into cathode and anode compartments and concentrating the aqueous caustic alkali solution obtained as catholyte in an evaporator, the improvement which comprises utilizing as heat source at heating side for the evaporator a heated substance generated during electrolysis in the electrolytic cell thereby to effect heat exchange with the solution to be concentrated in the evaporator.

In practicing the process of this invention, the substances heated by the heat generated in the electrolytic cell which can be utilized as heat source for heating the evaporator may include electrolytes and gases generated at both electrodes of anode and cathode. The electrolytes herein mentioned are inclusive of catholyte and anolyte as well as the middle compartment liquid in the so-called three compartment electrolysis. The present invention can be practiced by choosing as the heating substance any one, or two or more of the anolyte, the catholyte and the gases generated at the anode and cathode.

In electrolysis of alkali chloride by using of cation exchange membrane of the present invention, the temperature of the electrolytes are maintained at 50° to 120° C, preferably at 70° to 100° C, by circulating the electrolytes to consume the heat generated in the electrolytic cell for concentration of caustic alkali outside of the cell. The temperature is raised without loss of heat, but boiling of the electrolytes is prevented. Thus resistance between electrodes is not permitted to increase so that the voltage required does not increase.

The concentration of the catholyte is advantageously maintained at 15 to 35%. While the concentration of the catholyte during electrolysis is controlled by the transfer number of cation exchange membrane and the concentration of the migrating caustic alkali, it is preferable to maintain the concentration in the range as specified above by addition of some amount of water even when the migrating concentration through the membrane is sufficiently high. For, if the caustic alkali concentration is too high, for example 35% or more, the electrolysis voltage is abruptly increased; while if it is too low, concentration of the caustic alkali upto a concentration of about 50% by means of the heat generated in the electrolytic cell is difficult. For control of the catholyte concentration as mentioned above, it is preferred to add at least 18 g of water per one Faraday of current passage.

As the heat source for concentration of the catholyte in the electrolytic cell which is to be concentrated to a product, the heat generated in the electrolytic cell is utilized. For supply of the heat, it is critical that heat exchange should be effected between the substances heated by the heat generated in the electrolytic cell and the solution to be concentrated in the evaporator, (said solution is hereinafter referred to as "the evaporator liquid"). Therefore, the method wherein the heat generated in the electrolytic cell is utilized without heat exchange with the evaporator liquid is outside the scope of the invention.

The evaporator to be used in the present invention is not specifically limited. But, multiple-stage flash evaporator and multiple-effect evaporator are particularly preferred.

As mentioned above, either one, or two or more of the electrolytes and the gases generated at cathode and anode is utilized as heat source for heating the evaporator in the present invention. There are various embodiments for utilization of the heat. Typical examples, which will be explained in further detail by referring to accompanying drawings hereinafter, are as follows:

The first one is, of course, heat exchange between the catholyte and the evaporator liquid. The heat generated in the electrolytic cell owes mostly to the heat generated at the cation exchange membrane, which is transferred by way of thermal conduction or water migrating by electric permeation mostly into the cathode chamber. Therefore, utilization of the catholyte is most important.

The second one is heat exchange between the line for discharging the anolyte and the evaporator liquid, since the heat generated escapes to said discharge line which is generally provided in cation exchange membrane process for discharge of a part of the anolyte to be utilized for dissolving the starting salt.

The third one is heat exchange between the gas generated from cathode and/or anode and the evaporator liquid. This is intended for utilization of sensible heat contained in the gas as well as the latent heat of steam contained in the gas.

Another method for utilization of heat is to utilize by multiple-effect the steam generated in the evaporator as the result of heat exchange with the heat source of the heat generated in the electrolytic cell, whereby heat can be utilized with higher efficiency.

Further improved utilization of the heat can be effected by compressing the steam generated in the evaporator to be utilized for heating of the evaporator liquid.

In addition, such materials as the starting salt water supplied into the anode chamber and water supplied into the cathode chamber which are comparatively low in temperature can be brought into heat exchange with the liquid discharged from the anode, the gas generated from the anode and the gas generated from the cathode thereby to recover heat therefrom and recycle the heat discharged as much as possible into the electrolytic cell. Thus, the amount of heat exchanged with the evaporator liquid can effectively be increased.

According to the process of the present invention, an aqueous caustic alkali solution with a high concentration, for example about 50 wt.% or more, can be obtained from the outlet of cathode chamber without use of boiler steam as heat source. If necessary, the evaporator liquid may be heated partly by boiler steam while practicing the process of this invention.

For heat exchange in the various embodiments as mentioned above, conventional methods can generally be used. For example, for heat exchange between electrolytes and the evaporator liquid wherein mutual mixing is not desirable, conventional heat exchangers having heat transmitting surface made of metal or Karbate are used. Indirect heat exchange by use of heat transfer medium can also be employed when there is a problem such as corrosion. Furthermore, heat exchange between the gas generated from anode and the starting salt solution fed to anode or between the gas generated from cathode and the water supplied to cathode may be effected by direct contact by means of a packed tower or a porous plate tower.

The present invention may be better understood by reference to the drawing of typical flow sheet of this invention wherein caustic alkali is caustic soda, which is shown for the purpose of not limiting but only illustrative purpose.

In the accompanying drawings.

Figure 1:
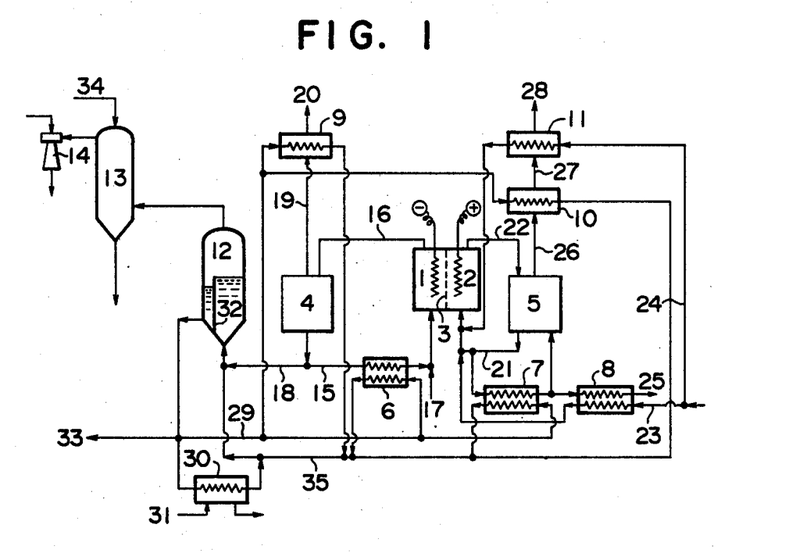
FIG. 1 shows typical flow sheet of this invention.

In FIG. 1, 1 is the cathode chamber of electrolytic cell, 2 anode chamber of electrolytic cell, 3 cation exchange membrane, 4 tank for catholyte, 5 tank for anolyte, 6 heat exchanger with catholyte, 7 heat exchanger with anolyte, 8 heat exchanger between the liquid discharged from anolyte and saltous water supplied, 9 heat exchanger with the gas generated from cathode, 10 heat exchanger with the gas generated from anode, 11 heat exchanger between the gas generated from anode and the saltous water supplied, 12 single stage vacuum evaporator, 13 condenser, and 14 noncondensed gas extractor.

Referring to catholyte circulation system, lines 15 and 16 form the circulation line through the catholyte tank 4, the heat exchanger 6 and cathode compartment 1, and the catholyte is cooled by 6. In FIG. 1, 1, 4 and 6 are connected in series, but 1 and 6 may be connected in parallel to 4 to achieve the object. Connection in series, however, is more effective in heat exchange. The exchanger 6 may also be provided on the line 16. Water is added through line 17. The catholyte in amounts corresponding to the caustic alkali produced in the electrolytic cell is withdrawn from line 18. The water through 17 may alternatively be added to 4, but more concentrated alkali can be withdrawn from 18 when it is added to line 15. Lines 19 and 20 are lines for discharging gas generated from cathode after gas-liquid separation in the catholyte tank, which gas is cooled by the heat exchanger 9 for heat recovery. Said heat recovery may be effected by water entering through 17.

In anolyte system, lines 21 and 22 form the circulation system between the anolyte tank 5 and the anode chamber 2. The heat generated in the anode chamber is recovered by means of the heat exchanger 7. 7 and 2 are connected in parallel to 5, but 5, 7 and 2 may be connected in series as in catholyte system. The exchanger 7 may also be provided on line 22. The heat exchanger 7 need not be provided in case when generation of heat is low or heat is sufficiently transmitted to cathode side through ion exchange membrane by, for example, pressing the cation exchange membrane against the anode while maintaining the inner pressure in the cathode chamber higher than that in the anode chamber. Lines 23 and 24 are lines for supplying feed salt water. By way of these lines, heat can be recovered at heat exchangers 8 and 11. Line 25 is the line through which the liquid discharged from the anode is removed from the anolyte circulation system. Lines 26, 27 and 28 are lines for discharging gas generated from the anode after gas-liquid separation in the anolyte tank, which gas is cooled by means of the heat exchangers 10 and 11 for heat recovery. When 11 is provided, heat recovery can fully be achieved without 10.

In evaporation system, the caustic alkali withdrawn from the catholyte circulation system through line 18 is cooled by flashing in the vacuum evaporator and thereby concentrated. The thus obtained evaporator liquid is circulated through lines 29 and 35 between the heat exchangers 6, 7, 9, 10 and 30 and the vacuum evaporator 12, while being heated, subjected to heat recovery and cooled by flashing in 12 to be concentrated. It is preferred to provide such means as the weir 32 to ensure complete flashing. The thus obtained concentrated alkali is withdrawn through line 33 in an amount corresponding to that formed in the electrolytic cell. The heat exchanger 30 is provided for the purpose of heating with boiler steam 31 and is not necessary when there is sufficient heat generation in the electrolytic cell. The steam generated from 12 is cooled in the condenser 13 by cooling water 34 to be condensed. A barometric condenser is generally preferred as 13. When a surface condenser is used as 13, the condensed water can preferably be reused through 17.

Figure 2:
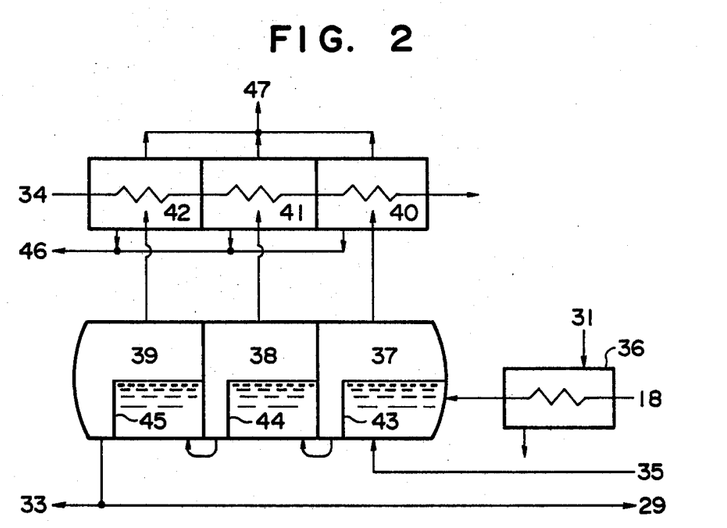
FIG. 2 flow sheet of a multi-stage flash evaporator wherein the heat source is connected in series.

In FIG. 1, description is made by referring to the case wherein single stage flash evaporator is used as the vacuum evaporator. It is more preferable, however, to use a multi-stage flash evaporator, as is described with reference to FIG. 2. In FIG. 2, description is given only with respect to the part corresponding to the vacuum evaporation system. The catholyte and anolyte systems, similar to FIG. 1.

In FIG. 2, 36 is steam heater in which the caustic alkali 18 withdrawn from the catholyte tank 4 in FIG. 1 is heated with steam 31, if necessary. The steam heater 36 is not necessarily provided. 37, 38 and 39 show a multi-stage flash evaporator system partitioned by partition walls; and 40, 41 and 42 a condenser system for condensing steam evaporated in respective stage. This is cooled by cooling water 34. The drain condensed in each condenser is withdrawn through 46 and may be provided for reuse in line 17 in FIG. 1. The noncondensed gas accumulated in each stage is withdrawn through line 47. 43, 44 and 45 are weirs. The evaporator liquid in each stage is transferred successively to subsequent stage by overflowing each weir. The extent of evacuation in each stage is increased in successive order. The caustic alkali is withdrawn through line 33 in amount corresponding to that formed in the electrolytic cell. Lines 29 and 35 correspond to lines 29 and 35 in FIG. 1 and they are circulation lines for heat recovery at various places. In FIG. 2, the liquid is circulated through 29 and 35 in series relative to these heat sources and 37, 38 and 39. The specific feature of the multi-stage flash evaporator of this type is that the amount of cooling water can be reduced, so that the outlet temperature of the cooling water can easily be raised, as compared with the single evaporator.

To compare FIG. 1 with FIG. 2, when the evaporator liquid concentrations in the final evaporator 39 and the single evaporator are fixed and cooling water outlet temperatures in condensers 43 and 13 are fixed, the evaporator liquid temperatures in 39 and 12 are approximately determined. In this case, in multi-stage flash evaporator, the amount of evaporation in each stage is reduced approximately in inverse proportion to the number of stages, so that the amount of cooling water required can be reduced in inverse proportion to the number of stages.

Furthermore, since the evaporator liquid temperature in the first stage can be fixed at a higher temperature compared with that in the final stage, the cooling water outlet temperature of the condenser 40 can also be fixed at a higher temperature so that the cooling water can be utilized effectively.

In the flash evaporator of this type, the amount of evaporation is small as compared with the amount of circulation through lines 29 and 35 and therefore the evaporator liquids in each stage are highly concentrated to substantially the same extent. Accordingly, the boiling point rise in each stage is great.

As a modification of the flow sheet shown in FIG. 2, only the liquid in line 33 can be flashed with a cooling medium after the stage 39 thereby to lower relatively the evaporator liquid concentrations in 37, 38 and 39. As the result, effective temperature difference can be fixed in condensers 40, 41 and 42 corresponding to the decrease in boiling point rise so that the required heat transmitting area in contact with cooling water can be reduced.

Furthermore, when the evaporator liquid temperatures in the first stage 37 and in the final stage 39, the inlet temperature of cooling water condenser 42 and the outlet temperature of the condenser 40 are fixed, effective temperature difference is increased as the number of stages is increased. Accordingly, the required heat transmitting area in contact with cooling water is decreased in inverse proportion.

Figure 3:
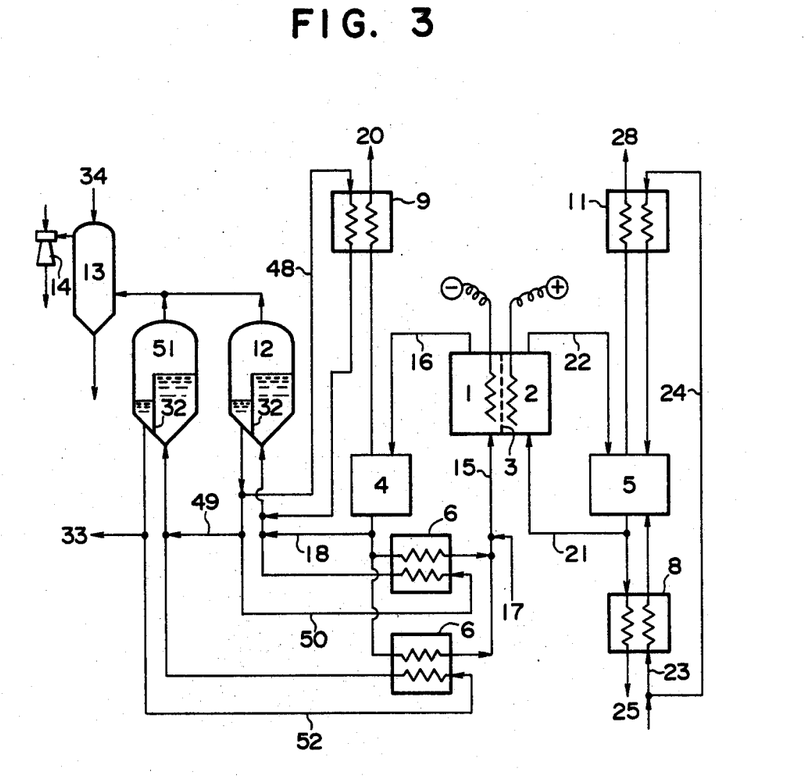
FIG. 3 flow sheet of a multi-stage flash evaporator wherein the heat source is connected in parallel.

Reference is now made to FIG. 3 to explain the multi-stage flash evaporator wherein the heat sources are provided in parallel. In FIG. 3, 1, 2, 3, 4, 5, 6, 8, 9, 11, 12, 13, 14, 15, 16, 17, 18, 20, 21, 22, 23, 24, 25, 28, 32, 33, and 34 correspond to the notations in FIG. 1. This flow sheet is specific in that the vacuum evaporators 12 and 51 are arranged in parallel for heat exchange with circulating catholyte by means of 6. Line 50 is circulation line for 12 and line 52 circulation line for 51.

In this flow sheet, as different from the FIG. 2, the evaporator liquid concentration in 12 can be maintained by far lower than that in 51. In general, as the concentration of aqueous caustic alkali solution increases so does the boiling point rise. Therefore, the inner evaporator temperature in 12 can be lowered, corresponding to the difference in boiling point rise, provided that inner evaporator pressures in 51 and 12 are the same. Accordingly, the evaporator liquid in 12 can be used effectively as cooling source for 9 or a large effective temperature difference can be fixed to obtain the effect of reducing the heat transmitting area in 6 in contact with the circulating catholyte.

Figure 4:
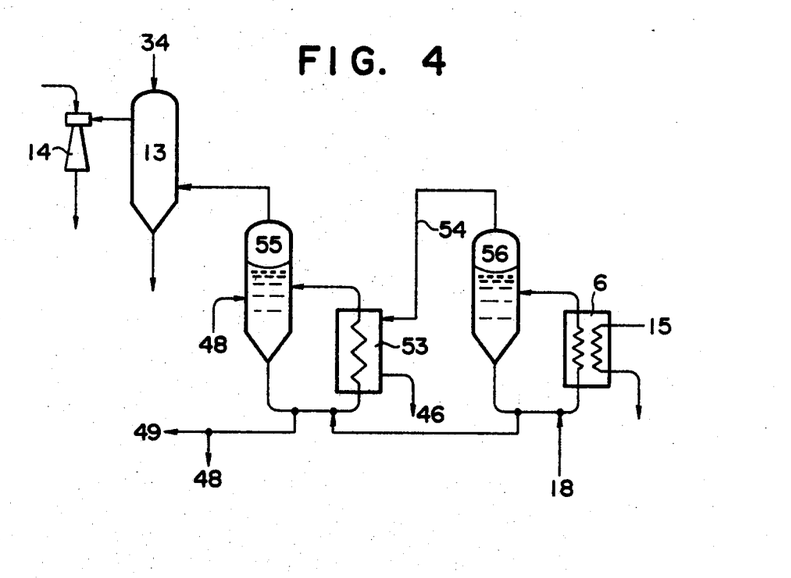
FIG. 4 flow sheet wherein a multiple-effect evaporator is used as the evaporator.

FIG. 4 shows a multiple-effect system which may be connected, for example to the line 18 of FIG. 1.

As mentioned above, boiling is preferably avoided in the electrolytic cell. Hence, the electrolytic cell temperature which is the heat source is controlled generally at 100° C or lower. Therefore, within the region wherein the evaporator liquid concentration is not too high and boiling point rise is not large, double or triple effect system can be arranged.

The produced aqueous caustic alkali solution which is withdrawn through line 18 from the catholyte circulation system is fed to the vacuum evaporator 56. In 56, evaporation occurs by utilizing as heat source the heat resulting from heat exchange in the heat exchanger 6 with the heating source in the electrolytic cell supplied from the line 15. If desired, the evaporator liquid in 56 can be supplemented by boiler steam.

The steam 54 generated in 56 is used for heating the evaporator liquid in the vacuum evaporator 55. 46 is the drain obtained by condensation of the steam 54 in the heat exchanger 53. 14, 13 and 34 are the same as in FIG.

1. The concentration of the evaporator liquid in 55 is low and the evaporator liquid temperature can be low. Therefore, it can be used as cooling source through the line 48 for cooling the gas generated from cathode. Caustic alkali is withdrawn from the line 49 in amount corresponding to that of caustic alkali formed and fed into the vacuum evaporator 12 in FIG. 1, wherein it can be further concentrated using the heat generated in the electrolytic cell as heat source. Alternatively, in place of 12, it can be fed into the multi-stage flash evaporator as shown in FIG. 2 or FIG. 3. When a falling film type evaporator is used for 53 and 55, effective temperature difference can be made larger and the amount of circulated liquid is decreased to result in better effect.

This system is specific in that operation can be made without use of boiler steam under a low electrolysis voltage since the heat can very efficiently be used.

Figure 5:
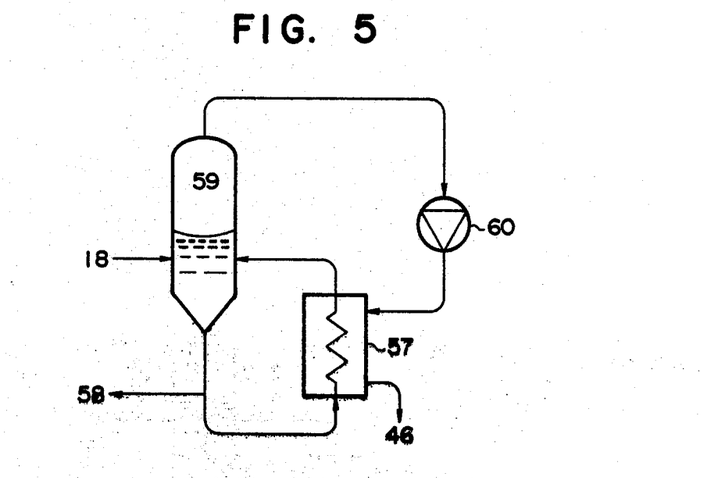
FIG. 5 flow sheet wherein a self-steam compression type evaporator is used as the evaporator.

FIG. 5 shows self-steam compression system. This system is arranged, for example in the system illustrated in FIG. 1, at the line 18 between the catholyte tank 4 and the vacuum evaporator 12.

18 and 46 in FIG. 5 correspond to the notations in FIG. 4. 59 shows the evaporator and 60 steam compression means such as compressor or steam ejector. 57 is a condenser and the evaporation latent heat of the steam evaporated in 57 can very effectively be utilized for heating the evaporator liquid in 59. In FIG. 4, the amount of steam to be used for multiple-effect is restricted because the evaporator liquid concentration in 55 is fixed due to the restriction from effective temperature difference; while in FIG. 5, there is no such restriction in the evaporator liquid concentration and steam can efficiently be provided for reuse to a great advantage.

When this system is used in combination, there is an advantage that no boiler steam is required even if the heat recovered is reduced by decrease in electrolysis voltage.

In ion exchange membrane process, it is generally observed that the voltage tends to increase abruptly when the caustic alkali concentration is 25% or more. A more effective concentration with less electric power is possible by combined use of the self-steam compression process rather than increasing the concentration to 25% or more to raise the electrolysis voltage.

While various other modes of combination with the self-steam compression process are conceivable, the embodiment shown in FIG. 5 is low in the amount of steam required and in boiling point rise so that the self-steam compression process can most effectively be applied. The inner evaporator pressure in 59 can be raised to any desired pressure by additional use of boiler steam in 57.

In the above, various modes of combination of the process wherein the present invention is applied as well as advantages thereof have been described.

These combinations show only typical examples of the present invention and the present invention is not limited thereto.

By application of the present invention, the electrolytic cell can be operated economically at a high current density since the electric power can effectively be utilized even when electrolysis voltage is elevated by increase of current density. When the electrolysis voltage is too low, the heat generated in the electrolytic cell is too small, whereby the effect of the present invention cannot fully be enjoyed. From this standpoint, the preferable range of the electrolysis voltage is from 3.5 to 5.0 volt per one cell.

EXAMPLE 1

Electrolysis of sodium chloride is carried out according to the flow sheet as shown in FIG. 1.

As cation exchange membrane, there is used a membrane having carboxylic acid groups only on the cathode side on a base polymer of fluorocarbon resin having pendant sulfonic acid groups. In a bipolar system electrolytic cell which is divided by this cation exchange membrane into cathode and anode chambers, electrolysis is carried out at a current density of 55 A/dm$^2$. The starting saturated aqueous sodium chloride solution is fed through lines 23 and 24. From the anode, chlorine gas is generated and discharged through lines 26, 27 and 28. From the cathode, hydrogen gas is generated and discharged through lines 19 and 20.

Figure 6:
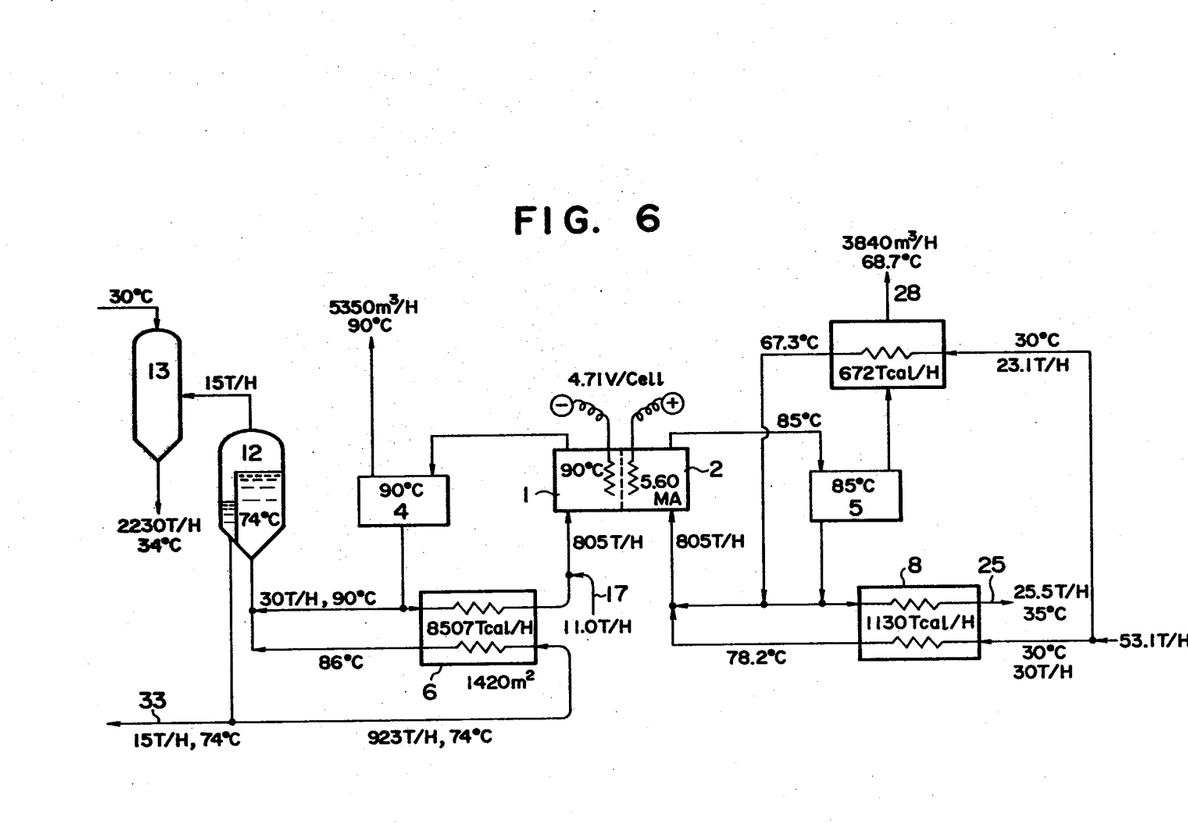
FIG. 6 heat balance and mass balance in Example 1.

As the catholyte, 25 wt.% aqueous caustic soda solution is obtained at a current efficiency of 90%. The electrolysis voltage per one cell is 4.71 volt. From line 33, 50 wt.% aqueous caustic soda solution is obtained at the flow rate of 15 tons/hour. The temperatures, flow rates and exchanged heat at each heat exchanger at principal points are shown in FIG. 6. In this example, heat exchange is not substantially conducted in the heat exchangers 7, 9, 10 and 30 in FIG. 1.

EXAMPLE 2

Electrolysis is carried out under the same conditions as in Example 1 except that the three-stage flash evaporator as shown in FIG. 2 is used in place of the single vacuum evaporator 12 in Example 1.

As the result, the evaporator liquid temperatures in each stage of 37, 38 and 39 are 82° C, 78° C and 74° C, respectively. The condenser outlet temperature upto 42° C is available. Accordingly, the amount of cooling water can be reduced by about one third as compared in Example 1. The heat balance in the entire system is kept with no use of the steam heater 36. The heat transmitting area required in the heat exchanger 6 is 1,420 m$^2$.

EXAMPLE 3

Electrolysis is carried out according to the flow sheet as shown in FIG. 3.

The two-stage flash evaporators are operated in parallel to the heat source 6. The liquid concentration in the first evaporator is lowered and, corresponding to the decrease in boiling point rise, the liquid temperature in the single evaporator is lowered. As the result, heat recovery in the heat exchanger 9 with hydrogen gas is performed effectively.

Figure 7:
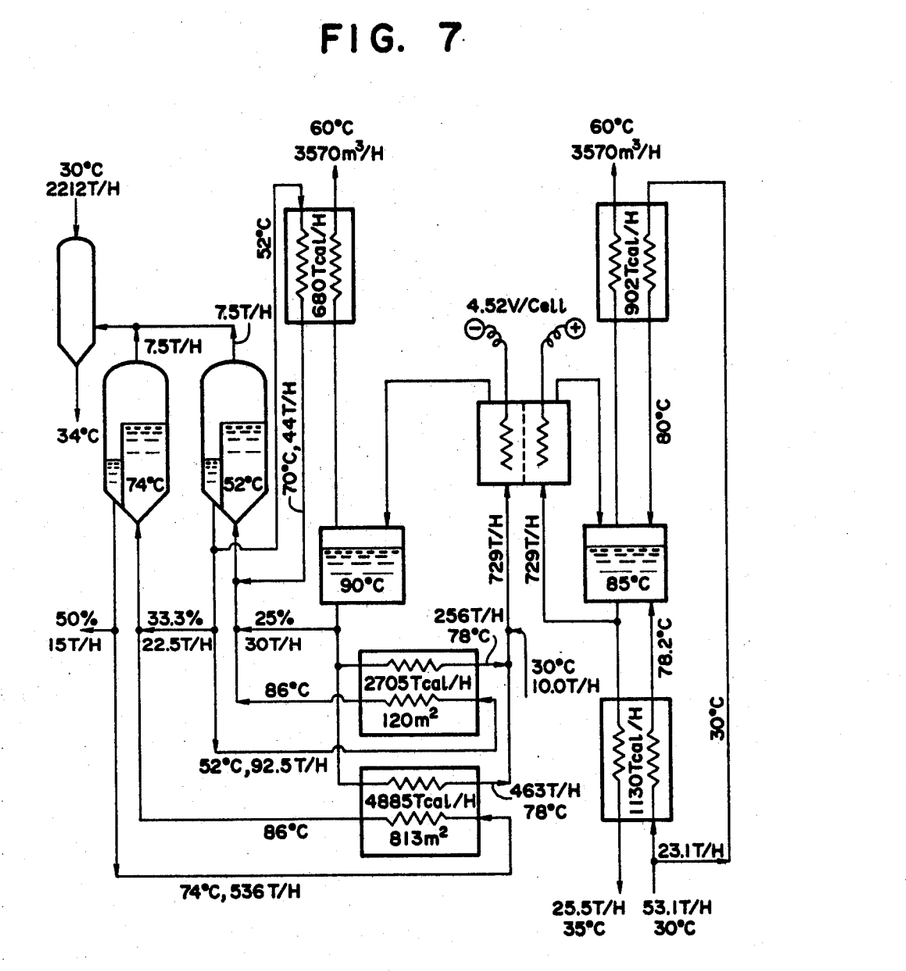
FIG. 7 heat balance and mass balance in Example 3.

By use of the same cation exchange membrane and electrolytic cell as used in Example 1, electrolysis is carried out under substantially the same conditions as in Example 1 except that the current density is lowered to 50 A/dm$^2$ and the electrolysis voltage is lowered to 4.52 volt per cell. The temperatures, flow rates and the exchanged heat in the heat exchangers at principal points in this electrolysis are shown in FIG. 7.

In this example, the evaporator is divided into two-stage evaporators and therefore the effective temperature difference can be made larger in the heat exchanger 6. The heat transmitting areas required are 120 m$^2$ and 813 m$^2$, showing a great decrease in heat transmitting area required as compared with Example 2.

EXAMPLE 4

Figure 8:
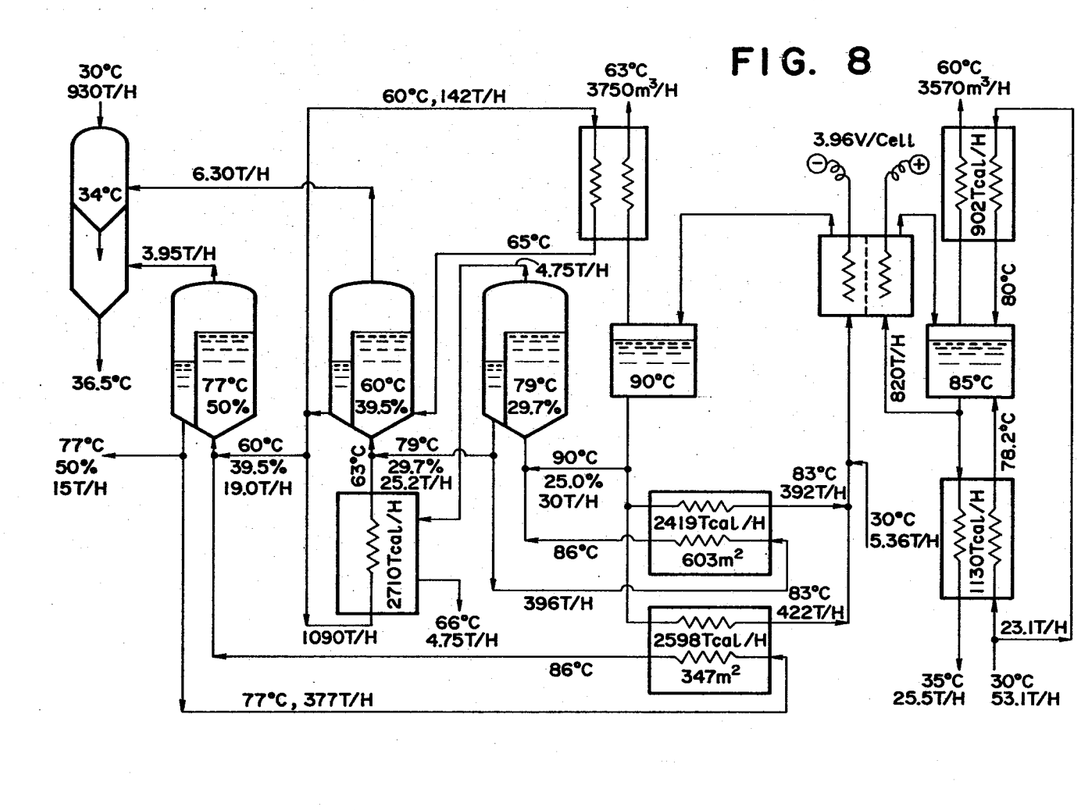
FIG. 8 heat balance and mass balance in Example 4.

Electrolysis is carried out according to the flow sheet as shown in FIG. 1 wherein the system of double-effect evaporator as shown in FIG. 4 is arranged at the line 18. The temperatures, flow rates and exchanged heat in the heat exchangers at principal points are shown in FIG. 8.

The same cation exchange membrane and electrolytic cell as used in Example 1 are used. As the result of reuse of 4.75 tons/hour of steam due to the effect of double-effect evaporator, the current density is decreased to 36 A/dm$^2$ and the electrolysis voltage to 3.96 volt per one cell. When electrolysis is carried out under otherwise substantially the same conditions as in Example 1, the heat balance can be kept in the entire system. Accordingly, while maintaining low electric power unit without use of boiler steam, 50% aqueous caustic soda solution can be obtained.

EXAMPLE 5

Figure 9:
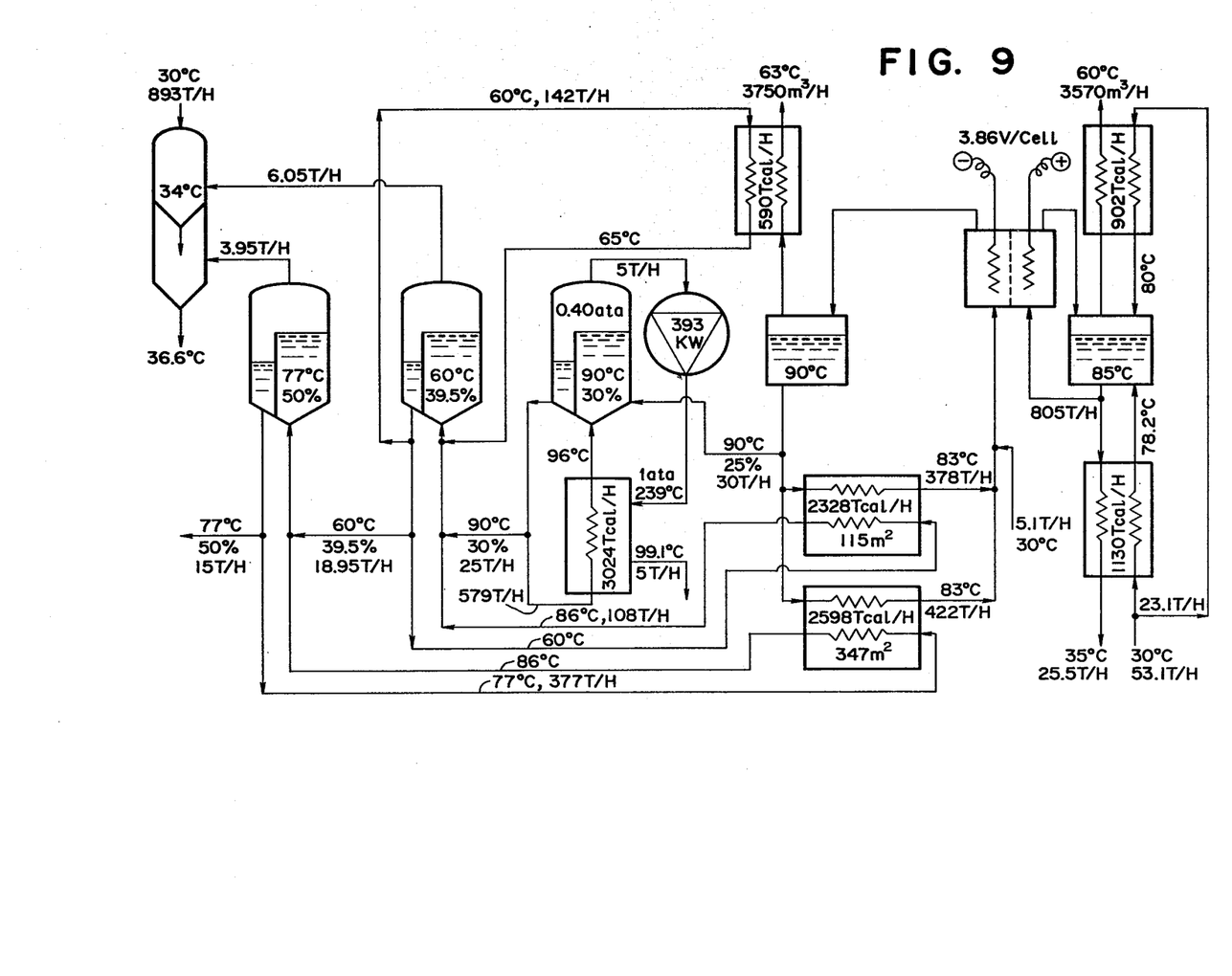
FIG. 9 heat balance and mass balance in Example 5.

Electrolysis is carried out according to the flow sheet as shown in FIG. 3 wherein the self-steam compression system as shown in FIG. 5 is arranged at the line 18. The temperatures, flow rates and exchanged heat in the heat exchangers at principal points are shown in FIG. 9.

The same cation exchange membrane and electrolytic cell as in Example 1 are used. As 5 tons/hour of steam is reused due to the effect of self-steam compression, the current density is decreased to 34 A/dm$^2$ and the electrolysis voltage to 3.86 volt. When electrolysis is carried out under otherwise substantially the same conditions as in Example 1, the heat balance in the entire system can be kept. Accordingly, while maintaining low electric power unit without use of boiler steam, 50% aqueous caustic soda solution can be obtained.

What we claim is:

1. In a continuous process for producing an aqueous alkali metal hydroxide solution by electrolysis of an aqueous alkali metal halide solution using a cation exchange membrane to divide the cell into cathode and anode compartments and concentrating, in an evaporator, the alkali metal hydroxide solution obtained as a catholyte the improvement which comprises utilizing the heat generated by electrolysis as a heat source for the heating side of the evaporator by the steps of:
   1. circulating a first portion of the catholyte through a heat exchanger where it gives up heat values;
   2. diverting a second portion of the catholyte to an evaporator;
   3. adding sufficient water to the circulating catholyte to replace said second portion of catholyte;
   4. evaporating and thereby cooling said second portion of the catholyte in said evaporator to a selected concentration and temperature;
   5. collecting a first fraction of said second portion of the catholyte as a final product;
   6. circulating a second fraction of said second portion of the catholyte through said heat exchanger where it is heated by the heat values of said first portion of the catholyte and thereby reheated; and
   7. returning the reheated second fraction to said evaporator;

the liquid flow in Steps 1 through 7 being maintained at a rate such that:
   a. the temperature of the catholyte in the cathode compartment is from 50° C to 120° C;
   b. the concentration of alkali metal hydroxide of the catholyte is from 15% to 35%;
   c. the volume of liquid to be concentrated in the evaporator is substantially constant.

2. A process as in claim 1 wherein gas generated in the cathode is passed through a heat exchanger prior to collection and gives up heat values to a portion of said second fraction of said second portion of the catholyte, and said portion is returned to said evaporator.

3. A process as in claim 1 wherein gas generated in the anode is passed through a heat exchanger prior to collection and gives up heat values to a portion of said second fraction of said second portion of the catholyte, and said portion is returned to said evaporator.

4. A process as in claim 1 wherein the amount of water added to said first portion of the catholyte is at least 18 grams per Faraday of current passage.

5. A process as in claim 1 wherein the alkali metal halide is sodium chloride.

6. A process as in claim 1 wherein the evaporator is a multi-stage flash evaporator.

7. A process as in claim 1 wherein the evaporator is a multi-effect evaporator.

8. A process as in claim 1 including the additional step of compressing the steam generated in the evaporator.

* * * * *